United States Patent [19]
Werner

[11] 3,811,169
[45] May 21, 1974

[54] ARRANGEMENT FOR INSERTING PREFABRICATED COILS OF WIRE INTO THE SLOT OF ELECTRICAL MACHINES

[75] Inventor: Guenther Werner, Dresden, Germany

[73] Assignee: VEB Elektromat, Dresden, Germany

[22] Filed: Nov. 21, 1972

[21] Appl. No.: 308,471

[52] U.S. Cl. ............................................. 29/205 D
[51] Int. Cl. ........................................... H02k 15/06
[58] Field of Search....... 29/205 D, 205 R, 596, 606

[56] References Cited
UNITED STATES PATENTS

| | | | |
|---|---|---|---|
| 2,432,267 | 12/1947 | Adamson | 29/596 |
| 3,324,536 | 6/1967 | Hill | 29/606 X |
| 3,447,225 | 6/1969 | Eminger | 29/205 D |
| 3,559,268 | 2/1971 | Droll | 29/205 D |
| 3,602,972 | 9/1971 | Droll | 29/205 D |
| 3,689,976 | 9/1972 | Donovan | 29/205 D |

Primary Examiner—Thomas H. Eager
Attorney, Agent, or Firm—Michael S. Striker

[57] ABSTRACT

The arrangement includes a supporting structure and a plurality of elongated insertion guide units mounted on the supporting structure and arranged along the periphery of a circle for guiding prefabricated coils. The insertion guide units are spaced from each other in circumferential direction. Adjacent ones of the insertion guide units define between themselves elongated insertion guide slots adapted to receive prefabricated coils and adapted to register with the slots of the electrical machine into which the prefabricated coils are to be inserted. A stripper is mounted on the support structure for movement relative to the elongated insertion guide units, in the direction of elongation of the elongated insertion guide units, and is operative for pushing prefabricated coils in the insertion guide slots along the length of the insertion guide slots into the slots of the electrical machine into which the prefabricated coils are to be inserted. Adjacent insertion guide units comprise facing side wall portions together defining one of the aforementioned elongated insertion guide slots. The facing side wall portions are mounted for sliding movement relative to the supporting structure and also relative to the stripper in the direction of the elongation of the elongated guide slots. Thus, as the stripper pushes a prefabricated coil along the length of an insertion guide slot, wedging of the coil in the insertion guide slot will result in travel of the aforementioned side wall portions with the coil, thereby avoiding the damage which can result to a tightly wedged coil, particularly to the insulation thereof, when pushed by a stripper along the length of the respective insertion guide slot.

6 Claims, 7 Drawing Figures

FIG. 6
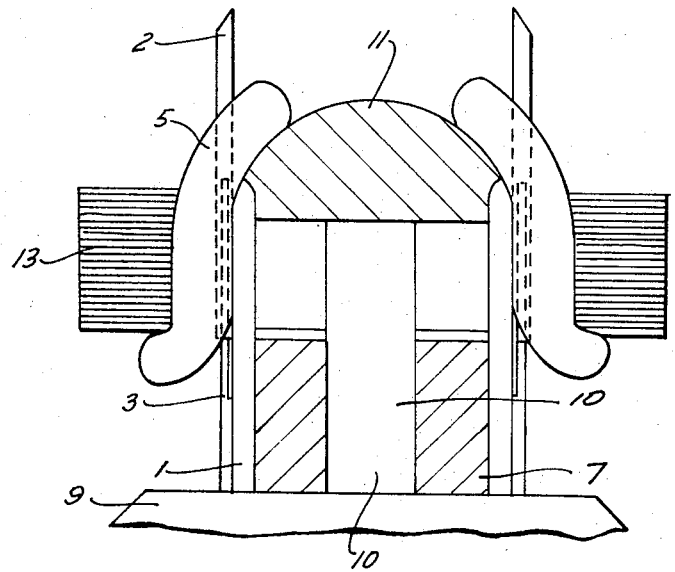
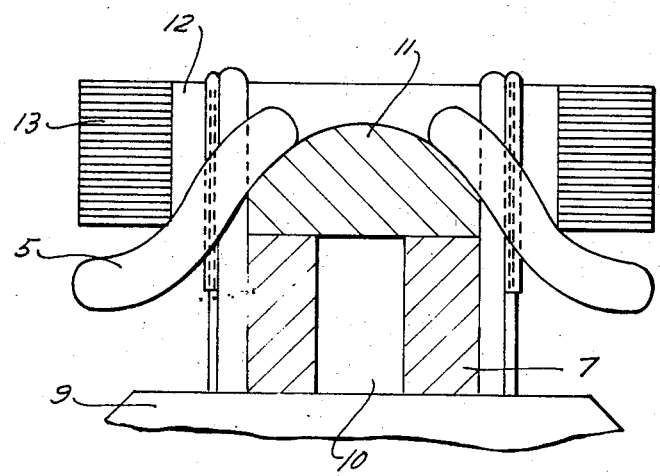
FIG. 5

ARRANGEMENT FOR INSERTING PREFABRICATED COILS OF WIRE INTO THE SLOT OF ELECTRICAL MACHINES

BACKGROUND OF THE INVENTION

The invention relates to an arrangement for the mechanical insertion of prefabricated coils in the grooves of electrical machines.

The known arrangements of this type consist basically of a ring of axially extending bar-shaped inserting members and a star-shaped inserting structure slidable in direction longitudinally of the ring of bar-shaped members. The prefabricated coils are so inserted between the bar-shaped inserting members that the coil ends are located to one side of the star-shaped inserting structure. Thereafter the stator is mounted on the bar-shaped inserting members in such a manner that the inserting members lie with their outer surfaces against the stator bore and the spaces between the inserting members form the entrances to the slots. By sliding in the star-shaped inserting structure, the coils are introduced into the slots. The greatest difficulty of this method results from the fact that under a variety of circumstances, and in dependence on factors which affect the frictional relationships between the axially relatively moving members, as well as the shape and surface characteristics of the work tool, the coil wires tilt or become slightly displaced and become clamped between the bar-shaped inserting members during the inserting operation. As a result the insulation of the wires of the prefabricated coils can become damaged, and the inserting members themselves can be irreparably damaged. In order to alleviate this difficulty, it is known to make the bar-shaped inserting members of substantially trapezoidal cross-sectional configuration, and also to make as thin as possible the bars which project into the slots, cover the edges of the tooth crest and also determine the width of the minimum spaces, and also to make the surface of the bar-shaped inserting members as hard and smooth as possible. Furthermore, as another way of counteracting the tendency to clamp, it is known to secure at least one of two neighboring bar-shaped inserting members on the star-shaped inserting structure which is slidable in direction longitudinally of the bar-shaped inserting members.

Experience has shown that by resort to the known expedients it is not in general possible to eliminate the undesired clamping of the wires of the prefabricated coils between the bar-shaped inserting members. Even upon resort to bar-shaped inserting members mounted on the star-shaped inserting structure, the developed friction forces resulting when certain relationships exist between the coil-wire strength, the slot-width and the speed of movement of the star-shaped inserting structure, are such that the coil wires become clamped or wedged. The wire strength and the width of the slots are determined by the actual construction of the electrical machine and cannot be varied for the purposes in question. An increase of the slot width is possible only by a further reduction of the wall strength of the bar-like portion extending into the slot. In dependence upon surface hardness, however, these bar-like portions break rather easily, even when the currently prevailing wall strengths are resorted to, with the result that the bar-shaped inserting members, which are manufactured by a complicated pre-stressing and hardening process, must be replaced.

It is the object of the invention to shorten the assembly time and down-time by eliminating the known shortcomings, to reduce the cost for the bar-shaped inserting members, to reduce the wastage in the production of such members, and in general to make possible a comprehensive improvement in inserting techniques.

According to the invention, these objects are met in that the bar-shaped inserting members consist of several parts, and the part which covers the tooth crest is arranged movable in longitudinal direction. The individual parts, by reason of their shapes, can be manufactured individually with far greater ease and simplicity than can complete bar-shaped inserting members of the type currently prevailing, inasmuch as the respective materials and operating steps can be adjusted to the specific requirements. By resort to this expedient, the susceptibility to damage is reduced. Furthermore, those parts subject to wear can be readily replaced, and the bar-shaped inserting members can be adapted to different tooth crest edge breadths.

Furthermore, there is eliminated a clamping of those parts which are movable in longitudinal direction and located at the narrowest place between the bar-shaped inserting members, inasmuch as these parts are moved upon the development of large enough frictional forces, these being the very forces which would ordinarily, and in combination with other disadvantageous factors, actually bring about the undesired clamping.

It is particularly advantageous to make those parts of the bar-shaped inserting members which are movable in longitudinal direction, of spring steel. By reason of the higher elasticity and the better resistance to wear, the slot width between the bar-shaped inserting members can be increased to an optimum extent.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

FIG. 5 depicts the coil inserting apparatus prior to the insertion of coils into the slots of the electrical machine;

FIG. 6 depicts the coil inserting apparatus of FIG. 5 subsequent to the insertion of coils into the slots of the electrical machine.

Figure 4:
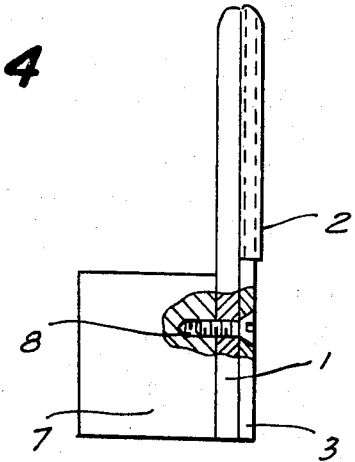
FIG. 4 depicts an elongated insertion guide unit mounted on a portion of the supporting structure.

FIG. 4 depicts a single elongated insertion guide unit 1, 2, 3 mounted by a bolt 8 on a supporting structure 8. Each elongated insertion guide unit 1, 2, 3 is comprised of two parts 1 and 3, bolted together by bolt 8 at the bottoms thereof. The upper portion of member 3 is recessed, so as to define intermediate the upper portions of members 1 and 3 an elongated mounting slot. Slidably mounted in this mounting slot is an elongated profiled member 2 of generally U-shaped cross-section. The profiled member 2 is slidable upwardly (as viewed in FIG. 4) in the just-mentioned mounting slot.

Figure 7:
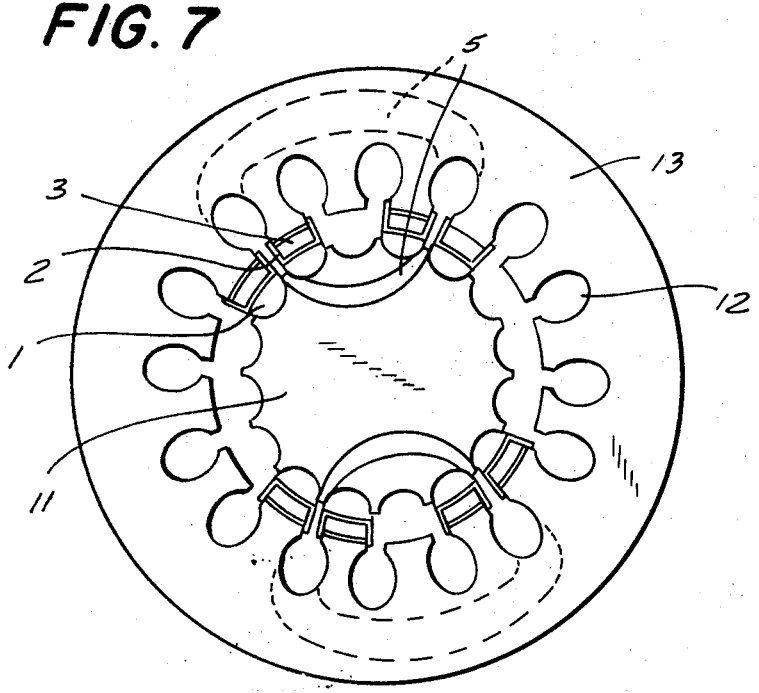
FIG. 7 depicts the elongated insertion guide units of the coil inserting apparatus in place in the stator bore of a stator.

The supporting structure 7 is cylindrical in shape and supports a plurality of such insertion guide units 1, 2, 3, as will be evident from FIGS. 5, 6 and 7. FIG. 7 shows that the plurality of insertion guide units 1, 2, 3 are arranged on the periphery of a circle. Moreover, FIGS. 5 and 6 show that the supporting structure 7 is mounted on a further supporting structure 9.

As shown in FIG. 7, the angular disposition of the coil-inserting apparatus relative to the stator 13 is such that the radially outermost portion 3 of each insertion guide unit 1, 2, 3 is in registry with one of the stator teeth. Also, the elongated slot defined between the facing side portions 2 of adjoining guide units 1, 2, 3 define between themselves an elongated insertion guide slot 6 (see FIG. 1) which is in registry with the slots 12 of the stator 13 (see FIG. 7).

FIG. 5 shows the conventional manner in which two prefabricated coils 5 are guided through the elongated guide slots defined between adjoining guide units 1, 2, 3. Once the coils 5 are in the position shown in FIG. 5, they are inserted into the stator slots 12 by moving the coils 5 upwardly under the action of a stripper means 10 and 11. As shown in FIG. 5, the mushroom-shaped head 11 of the stripper is initially in its lowermost position, and then moves to an elevated position (FIG. 6) forcing the coils 5 to rise and travel along the length of the insertion guide slots 6.

As will be evident from FIG. 7, the mushroom-shaped head 11 of the stripper 10, 11, as seen from above, has a plurality of circumferentially spaced indentations complementary to the curved convex surface portions of the elongated members 1. As the stripper head 11 rises, the stripper forces the portion of coil 5 located in the guide slot 6 intermediate two facing side wall portions 2 to travel upwards towards the top of the guide slot 6. The upward stroke of the stripper 10, 11 can be effected by suitable (non-illustrated) hydraulic means.

As mentioned with respect to FIG. 4, the elongated insertion guide unit 1, 2, 3 is comprised of a slidable profiled member 2 slidable in an elongated mounting slot defined between members 1 and 3. Members 1 and 3 together define an elongated insertion guide finger.

When the stripper 10, 11 moves from the FIG. 5 position to the FIG. 6 position, the coils 5 are pushed upwardly by stripper head 11, as mentioned above. In the event that the portion of one of the coils 5 located in the elongated insertion guide slot 6 intermediate members 2 becomes wedged in such insertion guide slot, no damage will be done to the coil 5. Instead of the stripper 10, 11 driving a tightly wedged coil 5 along the length of the elongated insertion guide slot 6, the slidably mounted members 2 to either side of the jammed guide slot will travel upwardly in frictional engagement with the wedged portion of the coil 5. It will be noted from FIG. 7 that the members 2 of U-shaped cross-section each have two side portions which extend somewhat beyond the radially outermost edges 4 of the respective guide finger portion 3, covering such edges 4. This is particularly advantageous, since such edges 4 if not covered might exert a cutting force upon a wedged coil portion. It will also be noted from FIG. 7 that the sides of the U-shaped members 2 actually engage the side portions of the teeth of the stator 13, to make for a positive alignment between the stator teeth and the insertion guide units 1, 2, 3.

Figure 1:
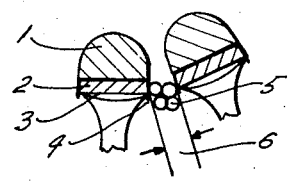
FIG. 1 is a section through two neighboring bar-shaped inserting members transverse to their elongation.

FIG. 1 shows, on a slightly larger scale, two insertion guide units 1, 2, 3, showing in particular how the side portions 2 cover the respective edges 4 of the member 3. The elongated insertion guide slot is designated by numeral 6, and a schematic showing is made of the passage through the guide slot 6 of several wires of a coil 5.

Figure 2:
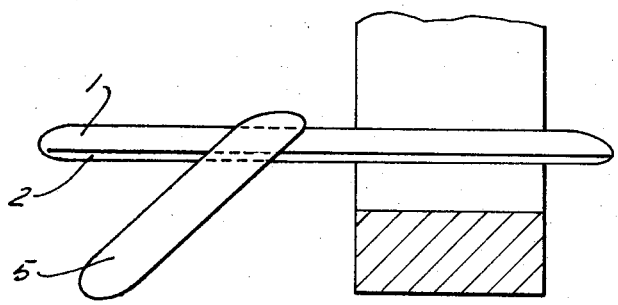
FIG. 2 depicts one bar-shaped inserting member prior to the insertion of the coil.
Figure 3:
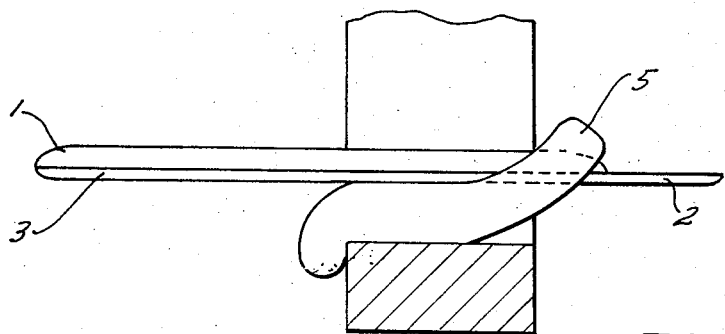
FIG. 3 depicts one bar-shaped inserting member subsequent to the insertion of a coil.

FIG. 2 shows the engagement between a coil 5 and an insertion guide unit 1, 2, 3 prior to insertion of the coil into the stator slot. FIG. 3 shows the arrangement of FIG. 2 after the insertion of the coil into the stator slot. It will bs seen that the frictional engagement between the coil 5 and the slidable member 2 has resulted in some travel of the member 2 with the coil 5. It will be appreciated that this ability of the member 2 to yield and travel with the coil 5 in the event of wedging or the development of excessive friction will very greatly reduce the possibility of damage to the insulation of the wires of coil 5.

Furthermore, the member 2 can be used as a discardable wear piece. When after many insertions of machine windings the member 2 becomes worn, it can simple be discarded. This is evidently much simpler and much more inexpensive than discarding the entire insertion guide unit 1, 2, 3.

Moreover, the use of the members 2 can lead to a desirable widening of the elongated insertion guide slot 6. Specifically, if the member 2 is made of an extremely hard and wear-resistant material, such as spring steel, then it can be formed from very thin sheet metal, thereby making for a significant increase in the breadth of the slot 6. Furthermore, as a result of the above, the members 1 and 3 of the guide unit 1, 2, 3 can be formed of less expensive and/or less strong material, such as ordinary work steel.

It will be understood that each of the elements described above, or two or more together, may also find a useful application in other types of constructions differing from the types described above.

While the invention has been illustrated and described as embodied in an arrangement for inserting prefabricated coils into the slots of electrical machines, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An arrangement for inserting prefabricated coils into the slots of an electric machine, the arrangement comprising, in combination, a supporting structure; a plurality of elongated insertion guide units mounted on said supporting structure and arranged along the periphery of a circle for guiding prefabricated coils, said insertion guide units being spaced from each other in circumferential direction, and adjacent ones of said elongated insertion guide units defining between themselves elongated insertion guide slots adapted to receive prefabricated coils and register with the slots of the electrical machine into which the prefabricated coils are to be inserted; and stripper means mounted on said support structure for movement relative to said elongated insertion guide units in the direction of elongation of said elongated insertion guide slots and operative for pushing prefabricated coils in said insertion guide slots along the length of said insertion guide slots into the slots of the electrical machine into which the prefabricated coils are to be inserted, wherein adjacent insertion guide units comprise facing side wall portions together defining one of said elongated insertion guide slots, said facing side wall portions each being mounted for sliding movement relative to said supporting structure and also relative to said stripper means in the direction of the elongation of said elongated guide slots, whereby as the stripper means pushes a prefabricated coil along the length of an insertion guide slot wedging of the coil in the insertion guide slot will result in travel of the side wall portions with the coil thereby avoiding the damage which can result to a tightly wedged coil when pushed by said stripper means along the length of the respective insertion guide slot.

2. The arrangement defined in claim 1, wherein said insertion guide units are comprised of an elongated insertion guide finger and a discrete side wall member mounted on said insertion guide finger for sliding movement relative to the guide finger in the direction of elongation of the guide finger and constituting said side wall portion of the insertion guide unit.

3. The arrangement defined in claim 2, wherein said insertion guide finger is provided with an elongated mounting slot extending in the direction of elongation of the guide finger, and wherein said side wall member is mounted in said mounting slot for sliding movement along the length of said mounting slot.

4. The arrangement defined in claim 3, wherein said mounting slot of the guide finger extends from one side of said guide finger to the other side of said guide finger, and wherein said side wall member is an elongated profiled member of substantially U-shaped cross section having two elongated side portions one of which constitutes said side wall portion of the insertion guide unit and having an elongated middle portion received in and slidable along the length of said mounting slot.

5. The arrangement defined in claim 3, wherein said discrete side wall member is composed of a material less susceptible to frictional wear than the material of the guide finger.

6. The arrangement defined in claim 5, wherein the material of said discrete side wall member is spring steel.

* * * * *